US006067374A

United States Patent [19]

Fan et al.

[11] Patent Number: 6,067,374

[45] Date of Patent: May 23, 2000

[54] SEAL DETECTION SYSTEM AND METHOD

[75] Inventors: Zhigang Fan, Webster, N.Y.; John W. Wu, Rancho Palos Verdes; Mike C. Chen, Cerritos, both of Calif.

[73] Assignee: Xerox Corporation, Stamford, Conn.

[21] Appl. No.: 08/969,491

[22] Filed: Nov. 13, 1997

[51] Int. Cl.[7] .......... G06K 9/00

[52] U.S. Cl. .......... 382/135; 382/137; 382/209

[58] Field of Search .......... 382/135, 137, 382/209

[56] References Cited

U.S. PATENT DOCUMENTS

| | | | |
|---|---|---|---|
| 4,153,897 | 5/1979 | Yasuda et al. | 340/146.3 |
| 5,216,724 | 6/1993 | Suzuki et al. | 382/135 |
| 5,291,243 | 3/1994 | Heckman et al. | 355/201 |
| 5,430,525 | 7/1995 | Ohta et al. | 355/201 |
| 5,437,897 | 8/1995 | Tanaka et al. | 428/29 |
| 5,533,144 | 7/1996 | Fan | 382/135 |
| 5,557,412 | 9/1996 | Saito et al. | 358/296 |
| 5,652,803 | 7/1997 | Tachikawa et al. | 382/135 |
| 5,659,628 | 8/1997 | Tachikawa et al. | 382/135 |
| 5,678,155 | 10/1997 | Miyaza | 399/366 |
| 5,731,880 | 3/1998 | Takaragi et al. | 358/296 |
| 5,790,165 | 8/1998 | Kuboki et al. | 347/251 |

*Primary Examiner*—Jose L. Couso
*Assistant Examiner*—Anh Hong Do
*Attorney, Agent, or Firm*—Aditya Krishnan

[57] ABSTRACT

A currency detection method that detects seals on currency in order to prevent printing and defeat counterfeiting. Seal patterns are detected. The detector has the ability to identify whether an image contains one or several pre-selected seal patterns. The detection is rotational and shift invariant—a suspect mark can be in any orientation and at any location within a tested image. With the method: a detector is trained off-line with distinctive marks resulting in templates which are generated and recorded for each of the distinctive; sample images bearing suspect marks are received by the detector and the location and orientation of the suspect marks are identified; the templates are rotated and shifted for alignment of the templates to the suspect marks; the templates and the suspects marks are compared to determine whether there is a match. A microprocessor is programmed to become familiarzed with a plurality of distinctive marks through training and to analyze and detect seals within tested documents. A memory stores the marks as templates. A scanner may be used with the system during training and detection to capture marks and tested images bearing marks for use by the system. The resulting output can be used by controlled systems, such as copiers and scanners, to suspend further action on documents where counterfeiting is suspected.

10 Claims, 3 Drawing Sheets

SEAL DETECTION SYSTEM AND METHOD

FIELD OF THE INVENTION

This invention is generally related to electronic image recognition techniques and, more particularly, to a seal detection system and method that detects and authenticates seals in complex images.

BACKGROUND OF THE INVENTION

The ability to detect seal patterns in an image can be useful in copier machines or scanners for the purpose of authenticating documents or preventing counterfeiting. The challenge of incorporating such a method in current copier or scanning technology is the difficulty with detecting seals patterns in a rotation or shift invariant manner. Specifically, the pattern could be of any orientation and at any location of the image. The orientation and the location of the seal can be relatively simple to estimate in the case of a single seal within a plain background; however, it becomes a major obstacle when the seals are embedded in some complicated image background.

Prior anti-counterfeiting or pattern detection methods are presented by the following patents:

U.S. Pat. No. 4,153,897

Yasuda, et. al.

Issued May 8, 1979

U.S. Pat. No. 5,216,724

Suzuki, et. al.

Issued Jun. 1, 1993

U.S. Pat. No. 5,291,243

Heckman, et. al.

Issued Mar. 1, 1994

U.S. Pat. No. 5,533,144

Fan

Issued July 1996

Yasuda et al. discloses a pattern recognition system where similarities between unknown and standard patterns are identified. Similarities are detected at first in respective shifting conditions where the unknown and standard patterns are relatively shifted from each other over the first limited extent, including the condition without shift. The maximum value of these similarities is then detected. The similarities are further detected in respective shifting conditions where the unknown and standard patterns are relatively shifted from each other over the second extent larger than the first limited extent, when the shifting condition which gave the maximum value is that without relative shift.

Suzuki et al. discloses an apparatus for image reading or processing that can precisely identify a particular pattern, such as banknotes or securities. A detecting unit detects positional information of an original image and a discriminating unit extracts pattern data from a certain part of the original image to discriminate whether the original image is the predetermined image based on the similarity between the pattern data and the predetermined pattern.

Heckman et al. discloses a system for printing security documents which have copy detection or tamper resistance in plural colors with a single pass electronic printer, a validating signature has two intermixed color halftone patterns with halftone density gradients varying across the signature in opposite directions, but different from the background.

Fan discloses an anti-counterfeit detector and method which identifies whether a platen image portion to be photocopied contains one or several note patterns. The detection is performed in a rotation and shift invariant manner. Specifically, the pattern can be of any orientation and at any location of the image and can be embedded in any complicated image background. The image to be tested is processed block by block. Each block is examined to see if it contains an "anchor point" by applying an edge detection and orientation estimation procedure. For a potential anchor point, a matching procedure is then performed against stored templates to decide whether the pre-selected monetary note patterns are valid once detected.

All of the references cited herein are incorporated by reference for their teachings.

SUMMARY OF THE INVENTION

A detection system and method that detects distinctive marks, such as seals or other patterns, in images for purposes of authentication or to defeat counterfeiting is presented. This detection method has the ability to identify whether an image contains one or several pre-selected distinctive marks.

A detector is first trained off-line with examples of the distinctive marks of interest to be detected during operation. The distinctive marks are each stored as templates. After training, to detect marks, a four step procedure consisting of binarization, location estimation, orientation estimation and template matching is performed. Binarization extracts a binary bitmap from the input image. A pixel in the bitmap is set to be "1" if the color of the corresponding pixel in the input image is close to the color of the template to be matched to the input image. Location estimation detects the "suspects", or the potential mark patterns, and estimates their location. The relative orientation of the suspects and the template is then evaluated, so they can be aligned (this method is rotation and shift invariant). Finally, after orientation, the suspect and template are compared and analyzed to verify if suspect is legitimate. A suspect mark can be in any orientation and at any location within an image.

The method can be summarized as follows:

- a detector is trained off-line with distinctive marks resulting in templates which are generated and recorded for each of the distinctive marks;
- sample images bearing suspect marks are received by the detector and the location and orientation of the suspect marks are identified;
- the templates are rotated and shifted for alignment of he templates to the suspect marks;
- the templates and the suspects marks are compared to determine whether there is a match.

The method can be carried out in a system comprising a microprocessor programmed to become familiarized with a plurality of seals through training and to analyze and detect distinctive marks within tested documents. A memory is used to store the marks of interest. A scanner may be used during training and detection to accept training marks and images bearing suspect marks, and transmits the captured images to the microprocessor; however, digitized representations of the training marks and images may also be accepted electronically over networks.

Other advantages and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

"Seal" will be used throughout the balance of this disclosure to define distinctive marks and distinctive patterns which may be commonly used in the document authentication art.

The detector is first trained off-line with examples of the seals to be detected. Training is conducted by scanning seals into a microprocessor-based detection system using scanning techniques known in the art. The seals are converted into templates representing each respective seal The training specific to this invention occurs after the system has received the electronic representation of the seals and consists of two steps. First, the color of the seal template is recorded. Second, the seal template is smoothed using an averaging filter (the same filter used in detection). The results, a smoothed version of the binary of the seal patterns, are recorded as a template.

To detect each seal, a four step procedure consisting of binarization, location estimation, orientation estimation and template matching is performed. Binarization extracts a binary bitmap from the input image. A pixel in the bitmap is set to be "1" if the color of the corresponding pixel in the input image is close to the color of the seal to be detected. Location estimation detects the "suspect", or the potential seals, and estimates their location. The relative orientation of the suspect and the seal is then evaluated, so they can be aligned. Finally, a template match verifies if the candidate is really the seal to be detected.

The location estimation is performed in two resolution. The detection of the suspects and the estimation of their rough positions are followed by a refinement of the locations. First, a low resolution version of the bitmap is produced. Each nxn pixels in the original bitmap is reduced to one pixel, which is set to be "1" if at least on of the nxn pixels is "1". A matched filter is then applied to detect the presence of any suspects. The kernel of the filter is given in FIG. 1. The strong peaks in the filtering result indicate the rough locations of the centers of the suspects. Once a strong peak is detected, the left, right top and bottom boundaries are searched in the original bitmap. FIG. 2 illustrates the detection of the left boundary at the fine resolution. A search is conducted from left to right in two nxn blocks, which are m blocks away from the location of the strong peak, where m=r/n and r is the radius of the seal to be detected. The first column which contains at least one "1" pixel gives the left boundary. The right, top and bottom boundaries can be obtained in a similar fashion. The x and y-coordinates of the center of the suspect are estimated as, $$x0=(\text{left boundary}+\text{bottom boundary})/2$$

and $$y0=(\text{top boundary}+\text{bottom boundary})/2,$$

respectively.

Figure 1:
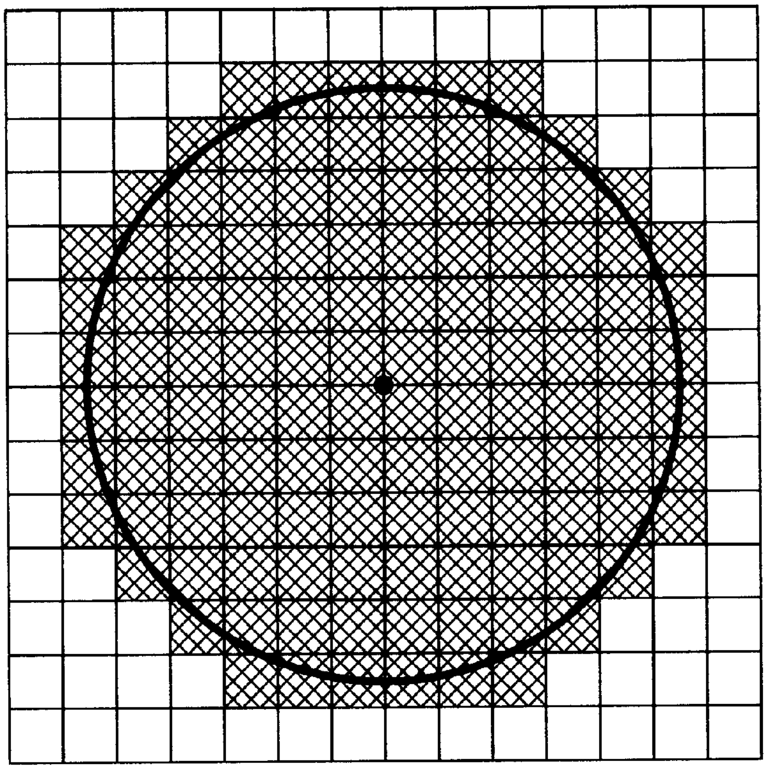
FIG. 1 is an illustration of a matched filter applied by the system to detect the presence of any suspects.
Figure 2:
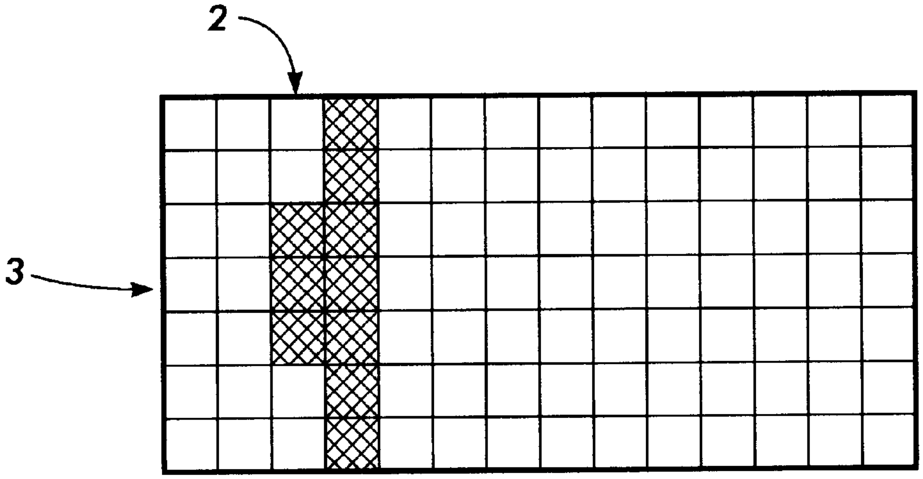
FIG. 2 illustrates the detection starting from the left boundary of the original bitmap for a mark at the fine resolution (a search is conducted from left to right in two nxn blocks, which are m blocks away from the location of the strong peak)

The data in the window, centered at (x0,y0) as shown in FIG. 1, are smoothed using an averaging filter to create a gray map. The actual window size is slightly larger than the diameter of the tested mark. A high (low) pixel value in the gray map corresponds dense "1" ("0") pixels in the bitmap. For the areas where "1" pixels and "0" pixels intermingle, a gray value in the middle results. This gray map is used for orientation estimation and template matching by comparing it to the gray map obtained from the mark to be detected.

Figure 3:
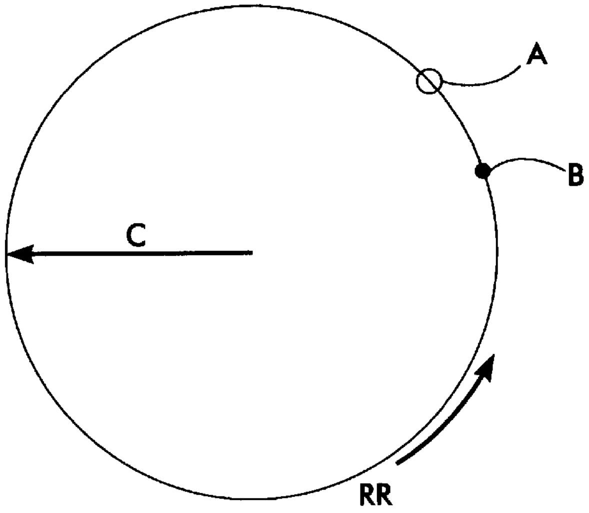
FIG. 3 illustrates a gray map on a circle of radius c with which data are sampled.
Figure 4:
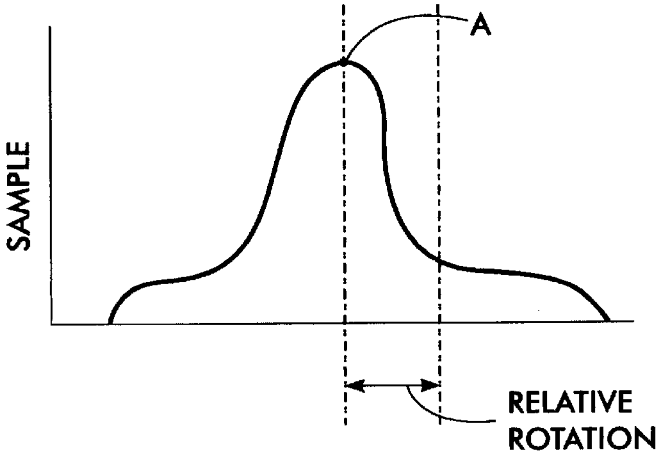
FIG. 4 illustrates a peak for the sample mark as "A"
Figure 5:
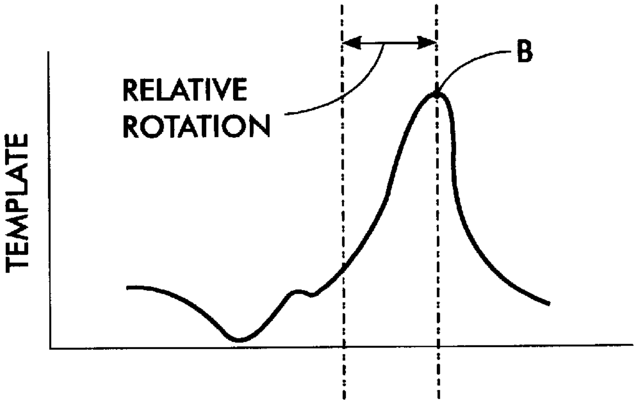
FIG. 5 illustrates a peak for the template as "B"

Referring to FIGS. 3, data are sampled in the gray map on a circle of radius c. The highest peak (or the lowest valley) position of the data reveals the orientation. Features other than the peak or valley position, or a transformation of the original data can also be used to determine the orientation. FIG. 4 illustrates a peak for the sample mark as "A". FIG. 5 illustrates a peak for the template as "B". A difference in rotation is noticeable upon comparing the peaks of the two sequences of data, sample (FIG. 4) and template (FIG. 5). To accomplish alignment, the template must be rotated "RR", as shown in FIG. 3, so that the peak of the template "B" matches the peak "A" of the sample.

Once the orientation of a suspect is determined, the template, which is the smoothed version of the seal bit pattern is rotated to align with the suspect. A template matching can be performed as revealed in U.S. Pat. No. 5,533,144 to Fan, or by using any other standard techniques.

Figure 6:
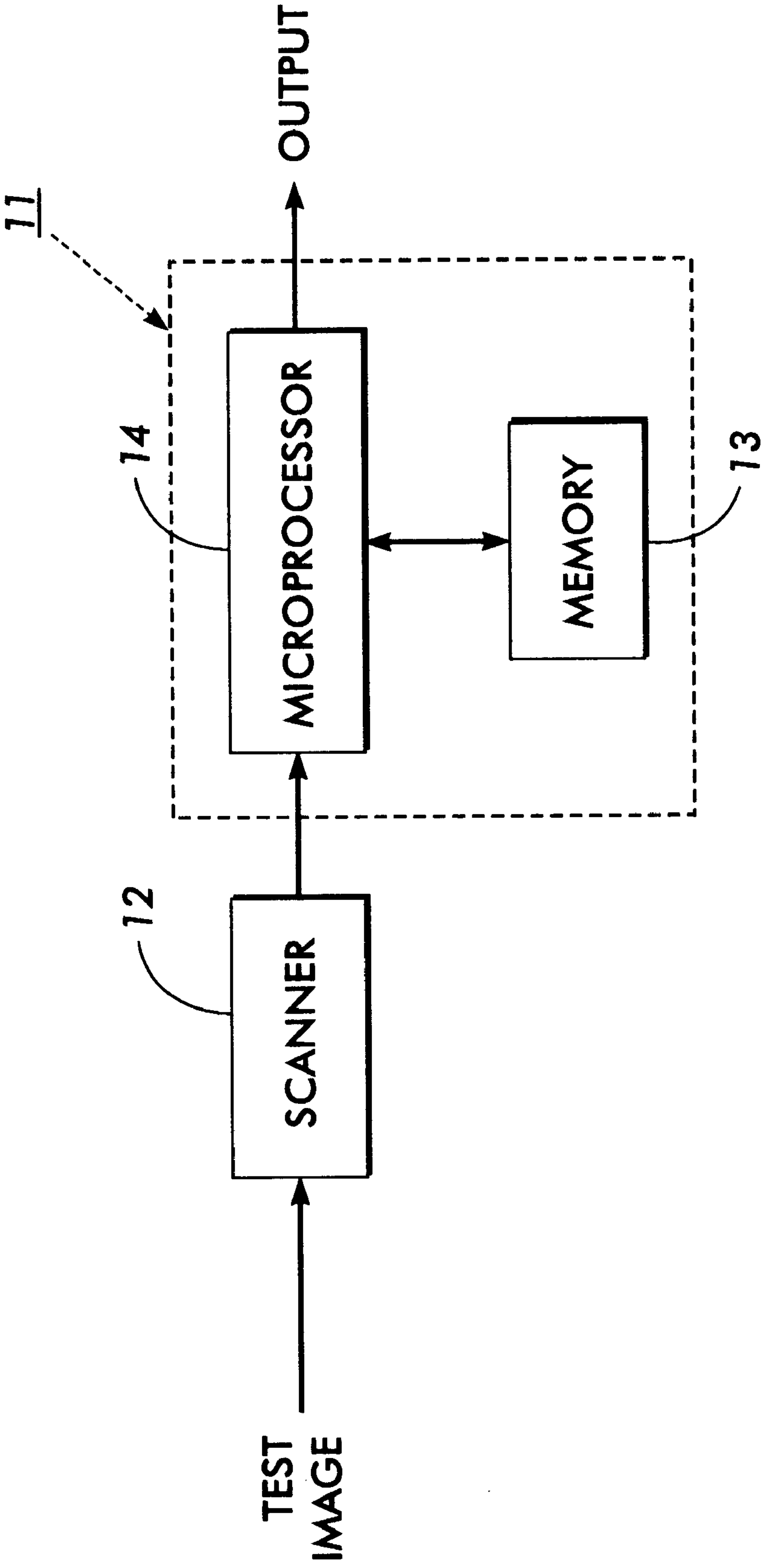
FIG. 6 is an block diagram of the system used to carry out the training and detection method of the invention.

Referring to FIG. 6, the detection method can be carried out in a system 11 comprising a microprocessor 14 programmed to become familiarized with a plurality of seals through training and to analyze and detect seals within tested documents. A memory 13 is used to store the seals of interest works hand in hand with the microprocessor 14 during detection. A scanner 12 is used with the system during training and detection to accept seals and images bearing seals (referred to as a "Test Image" in the figure) and transmit the seals and images to the microprocessor; however, the seals and images may also be transmitted electronically over networks, rather than directly from a scanner. After processing through the microprocessor 14, a testing result is "Output" to indicate counterfeit testing results. The output can be used by controlled systems, such as copiers and scanners, to suspend further action on documents where counterfeiting is suspected. It is noted that the microprocessor may be replaced by hardware equivalents through technical methods know in the art.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

We claim:

1. A counterfeit detection method that detects distinctive seals in documents, comprising:

training a detector off-line with distinctive seals so as to generate and record templates for each of said distinctive seals;

receiving sample images suspect seals from said detector for identifying the location and orientation of said suspect seals on said sample images;

aligning said templates by rotating and shifting of said templates to said suspect seals; and comparing said templates and said suspects seals to determine a match.

2. The method of claim 1, further comprising:

recording a color of said distinctive marks during said training step; and smoothing said distinctive seals using an binary averaging means, whereby said color of said distinctive seals and said smoothed version of the binary of said distinctive seals are generated and recorded as said templates.

3. The method of claim 2, comprising: said binary averaging means is a filter.

4. The method of claim 3, comprising said filter being used by said detector for identifying said suspect seals.

5. The method of claim 1, comprising:

generating a result after said templates and said suspects seals are compared to determine a match, and using said result for further action on said sample images.

6. The method of claim 2, comprising:

generating a result and comparing said templates and said suspects seals to determine whether there is a match, and using said result for action on said sample images.

7. An image detection method, comprising:

training a detection means with seals wherein templates are generated and recorded for each of said seals, respectively, by recording an image pattern for said seals which can be used during subsequent detection operations to test suspect image patterns within documents for similarities to said seals;

identifying suspect image patterns within tested documents and determining the location and orientation of said suspect image patterns;

rotating and shifting said templates before matching said templates to said suspect image patterns so that said templates align with said suspect image patterns; and matching said templates and said suspect image patterns by comparing said templates to said tested patterns to determine whether said templates and said suspect image patterns match.

8. The method of claim 7 wherein training further comprises generating said templates by selecting at least one color found within said seals and said color is recorded during training, and wherein said seals are smoothed using a binary averaging means, whereby said color of said seals and said smoothed version of the binary of said seals are generated and recorded as said templates.

9. The method of claim 7 wherein an result is generated after said matching and said result is used to facilitate further action on said documents being tested by with said method.

10. The method of claim 9 wherein said result is utilized by a copier system to prevent counterfeiting after detection of a mismatch between said templates and said suspect image patterns.

* * * * *